(12) United States Patent
Xie et al.

(10) Patent No.: US 9,202,269 B2
(45) Date of Patent: Dec. 1, 2015

(54) USER TERMINAL DEVICE, SERVER DEVICE, SYSTEM AND METHOD FOR ASSESSING QUALITY OF MEDIA DATA

(75) Inventors: Kai Xie, Beijing (CN); Xiao Dong Gu, Beijing (CN); Zhibo Chen, Beijing (CN)

(73) Assignee: Thomson Licensing (FR)

( * ) Notice: Subject to any disclaimer, the term of this patent is extended or adjusted under 35 U.S.C. 154(b) by 0 days.

(21) Appl. No.: 14/127,325

(22) PCT Filed: Jun. 21, 2011

(86) PCT No.: PCT/CN2011/076047
§ 371 (c)(1),
(2), (4) Date: Dec. 18, 2013

(87) PCT Pub. No.: WO2012/174711
PCT Pub. Date: Dec. 27, 2012

(65) Prior Publication Data
US 2014/0140612 A1   May 22, 2014

(51) Int. Cl.
*G06K 9/62* (2006.01)
*G06T 7/00* (2006.01)
*H04N 17/00* (2006.01)
*G06K 9/46* (2006.01)
(Continued)

(52) U.S. Cl.
CPC .............. *G06T 7/0002* (2013.01); *G06K 9/46* (2013.01); *H04N 17/004* (2013.01); *H04N 21/23418* (2013.01); *H04N 21/251* (2013.01); *H04N 21/475* (2013.01); *H04N 21/6582* (2013.01); *G06Q 30/0278* (2013.01); *H04L 41/5067* (2013.01)

(58) Field of Classification Search
USPC .................................................. 382/159, 206
See application file for complete search history.

(56) References Cited

U.S. PATENT DOCUMENTS 7,386,620 B2   6/2008  Lei et al.
8,130,274 B2 *  3/2012  Okamoto et al. ............. 348/180
(Continued)

FOREIGN PATENT DOCUMENTS

CN    1465197   12/2003
CN    1524386    8/2004
(Continued)

OTHER PUBLICATIONS

Search Rept: Dec. 29, 2011.
(Continued)

*Primary Examiner* — Yon Couso
(74) *Attorney, Agent, or Firm* — Jack Schwartz & Associates, PLLC

(57) ABSTRACT

A user terminal device, a server device, a system and a method for assessing quality of media data are described. The user terminal device is used for extracting artifact features from the media data and for communicating the features to the server device which is then used for determining a quality score using the artifacts and an artifact/quality score database accessible by the server device. The score, transmitted to the user terminal device, is presented to a user from which a subjective quality score and a request for re-determination are received which the user terminal device communicates to the server device. This in turn is used for re-determining the quality score and for transmitting back the re-determined quality score wherein the quality score is re-determined using the received artifacts, the received subjective quality score and the artifact/quality score database.

16 Claims, 2 Drawing Sheets

(51) Int. Cl.
*H04N 21/234* (2011.01)
*H04N 21/25* (2011.01)
*H04N 21/475* (2011.01)
*H04N 21/658* (2011.01)
*H04L 12/24* (2006.01)
*G06Q 30/02* (2012.01)

(56) References Cited

U.S. PATENT DOCUMENTS

| | | | | |
|---|---|---|---|---|
| 8,824,783 | B2* | 9/2014 | Xu et al. | 382/159 |
| 2003/0011679 | A1* | 1/2003 | Jung et al. | 348/181 |
| 2003/0012426 | A1* | 1/2003 | Ali | 382/155 |
| 2003/0095187 | A1 | 5/2003 | Ferguson | |
| 2005/0243910 | A1 | 11/2005 | Lee et al. | |
| 2007/0103551 | A1 | 5/2007 | Kim et al. | |
| 2009/0112778 | A1 | 4/2009 | Beck et al. | |
| 2010/0260271 | A1 | 10/2010 | Kapoor | |
| 2010/0318635 | A1* | 12/2010 | Senda et al. | 709/219 |

FOREIGN PATENT DOCUMENTS

| | | |
|---|---|---|
| CN | 101960863 | 1/2011 |
| EP | 1798897 | 6/2008 |
| JP | 2003199127 | 7/2003 |
| JP | 2004520752 | 7/2004 |
| JP | 2004521580 | 7/2004 |
| JP | 2005533424 | 11/2005 |
| JP | 2007221765 | 8/2007 |
| JP | 2011504042 | 1/2011 |
| JP | 2011510562 | 3/2011 |
| KR | 102010131735 | 12/2010 |
| WO | WO02087259 | 10/2002 |
| WO | WO03005726 | 1/2003 |
| WO | WO2004008780 | 1/2004 |
| WO | WO2009091530 | 7/2009 |
| WO | WO2009110238 | 9/2009 |

OTHER PUBLICATIONS

Vlado Menkovski et al., "Online QoE Prediction", Electrical Engineering Department, Eindhoven University of Technology, pp. 118-123, QoMEX 2010, 978-1-4244-6960-4/10, IEEE, 2010.

A. Poplawski "Computer-Aided System for Subjective Video Quality Assessment", Performance Manangement Patent Intelligence Center, 11062960, 2009, p. 9.

A. Poplawski, Computer-Aided System for Subjective video Quality Assessment, Pak, vol. 55, No. 7/2009, pp. 451-453.

Ulrich Engelke et al. "An Artificial Neural Network for Quality Assessment in Wireless Imaging Based on Extraction of Sturctural Information" 2007 IEEE International Conference on Acoustics, Speech and Signal Processing, Apr. 15-20, 2007, Honolulu, Hawaii, pp. I-1249-I-1252, ISBN: 978-1-14244-0727-9.

Supplementary European Search Report, European Patent Application No. 11 86 8269, Dated Jun. 12, 2015.

* cited by examiner

USER TERMINAL DEVICE, SERVER DEVICE, SYSTEM AND METHOD FOR ASSESSING QUALITY OF MEDIA DATA

This application claims the benefit, under 35 U.S.C. §365 of International Application PCT/CN2011/076047, filed Jun. 21, 2011, which was published in accordance with PCT Article 21(2) on Dec. 27, 2012 in English.

TECHNICAL FIELD

The invention is made in the field of media data quality assessment.

BACKGROUND OF THE INVENTION

Quality assessment of media data, e.g. graphics, still images, videos or audio files, is useful for evaluation and/or control of recording equipment, compression methods or transmission channels. It can be further used to monetize media content differently in dependency on the media's quality.

Most precise and direct way for assessing video quality is subjective quality score assignment. But, subjective assignment is expensive and time-consuming. Thus, objective video quality measurement (VQM) has been proposed as an alternative method, in which it is expected to provide a calculated score as close as possible to the average subjective score assigned by subjects.

In so called non-reference methods where no source media data information is available for VQM, mapping between objectively detectable features such as artefact features and the prediction of subjective scores is crucial. There is a bouquet of methods in the art for establishing such mapping. For instance, Artificial Neural Networks (ANN) are trained to predict mean observer scores (MOS) from objectively detectible artefact features. Although artificial neural networks achieve good results for test data in problems where training and test data are related to similar content, it is not easy to achieve stable performance when extending to wide range of contents.

Further, there are semi-supervised learning methods in which a small quantity of labelled and a large number of unlabeled data can be involved into training together to achieve better performance.

Due to the complexity of these underlying techniques, use of current video quality assessment (VQA) techniques, as described in unpublished PCT-Applications PCT/CN2010/000600 and PCT/CN2010/001630 for instance, has been restricted to professional customers due to high computing costs and correspondingly high expenses.

But individual media production and consumption becomes more and more popular. That is, customers can capture, process, compress, access, and share media content like music, audio takes, images and videos anywhere and anytime.

The more amateur and semi-professional users spread there content the more they are interested in becoming enabled to assess the quality of their media data just the way professionals do it.

However, cost of professional VQA is still too high for amateur.

SUMMARY OF THE INVENTION

Still, with the development of CE media devices adapted for generating amateur and semi-professional user's media data content of high quality and increased sharing of such content via social networks, there is need on solution of image7video quality assessment to help common customers to monetize, scan and monitor the quality of images or videos for user generated content processing, storage, and sharing.

Therefore, a user terminal device according to claim 1, a server device according to claim 2 and a system according to claim 4 is proposed. Furthermore, a method for assessing quality of a media data according to claim 5 is proposed.

In said method, a user terminal device is used for extracting artefact features from the media data and for communicating the extracted features to a server device. The server device is then used for determining a quality score for the media data. The quality score for the media data is determined using the received artefacts. The server device is further used for transmitting the determined quality score to the user terminal device wherein the user terminal device is used for presenting the received quality score to a user and for receiving, from the user, a subjective quality score and a request for re-determining the quality score. Then, the user terminal device is used for communicating the request for re-determining the quality score and the subjective quality score to the server device which in turn is used for re-determining the quality score for the media data and for transmitting the re-determined quality score to the user terminal device wherein the quality score for the media data is re-determined further using the received subjective quality score.

In an embodiment, this invention designs a service system to provide a distributed service, e.g. web service, to users to scan and monitor perceived quality of user's media (image/video) data set, with the features of low cost, no software installation, low bandwidth consumption without large media content transfer, no risk of user media content leakage, etc. An interface with user feedback is also provided to improve the performance of media quality assessment system.

That is, an embodiment of the invention addresses the provision of a client-server service model which can be implemented as a web application and which enables common end users to measure the perceived quality of their images and/or videos conveniently with user's privacy remaining protected and required bandwidth remaining limited.

Since artefact features from user's image/video dataset are extracted at the client side there is no necessity of uploading user's content entirely which prevents consumption of large bandwidth as well as leakage of user's content. Further, since the invention provides an interface for collection of user feedback, an exemplary embodiment of the system allows improving the effectiveness of the quality measurement algorithm by updating an underlying artefact/quality score database.

The features of further advantageous embodiments are specified in the dependent claims.

BRIEF DESCRIPTION OF THE DRAWINGS

Exemplary embodiments of the invention are illustrated in the drawings and are explained in more detail in the following description. The exemplary embodiments are explained only for elucidating the invention, but not limiting the invention's disclosure, scope or spirit defined in the claims.

In the figures.

EXEMPLARY EMBODIMENTS OF THE INVENTION

The client end of the invention may be realized on any electronic device comprising a processing device correspondingly adapted. For instance, the invention may be realized in a mobile phone, a personal computer, a digital still image camera, a digital video camera, an audio recording device or an mp3-player wherein this listing is non-exhaustive. The service centre of the invention may be realized on any commercially available server hardware.

This innovation tries to develop a new web service for allowing users to scan and evaluate perceived quality of the user's own media (e.g. image, video or audio) content. That is, a score, e.g. an observer score, a mean observer score or an average observer score, is automatically predicted for the content.

There are two parts in the designed service model: the client end and the service centre.

The client end is responsible for extracting features with which the score is correlated. For images ore videos, for instance, artefacts features such as blockiness, blur and noise have been found to correlate with mean observers core. A visual data focussed embodiment of the invention therefore comprises extracting such visual artefact features at the client end. For audio exemplary extracted artefacts comprise ringing, pre-echo, drop-outs, warbling, metallic ringing, underwater acoustics and hissing.

The client end is run at user's terminal, such as PC, tablet or mobile device, e.g. still image or video camera stand alone devices or video or still image camera phones. The client end can be implemented as Java applet for a browser or a plug-in for common audio/image/video management software/tool, such as Microsoft Windows media Player, Microsoft Windows Live Photo Gallery and Google Picasa.

Another function of the client end is collecting the user feedback. It means if the user is not satisfied with the quality score determined by the service centre, in response the user can give a subjective quality score, which will be transmitted to the service centre to adjust the determination and/or improve at least one of the artefact/quality score database and the algorithm used for determination. In an embodiment where semi-supervised learning is used at the server side for score prediction, the extracted artefacts and the user's subjective score can serve as another labelled training data set. Similarly, the user's subjective score can be used for adjusting an ANN.

The service centre is responsible for determining or predicting the perceived quality of the image/video based on the artefact features extracted by the client end. The service centre is commonly run at a remote side. In an exemplary embodiment, the service centre is adapted to enlarge and/or modify the image/video dataset based on the artefact features collected from the client and the user feedback of subjective quality score, and to improve the performance of quality measurement algorithm with some self-learning mechanism.

Figure 1:
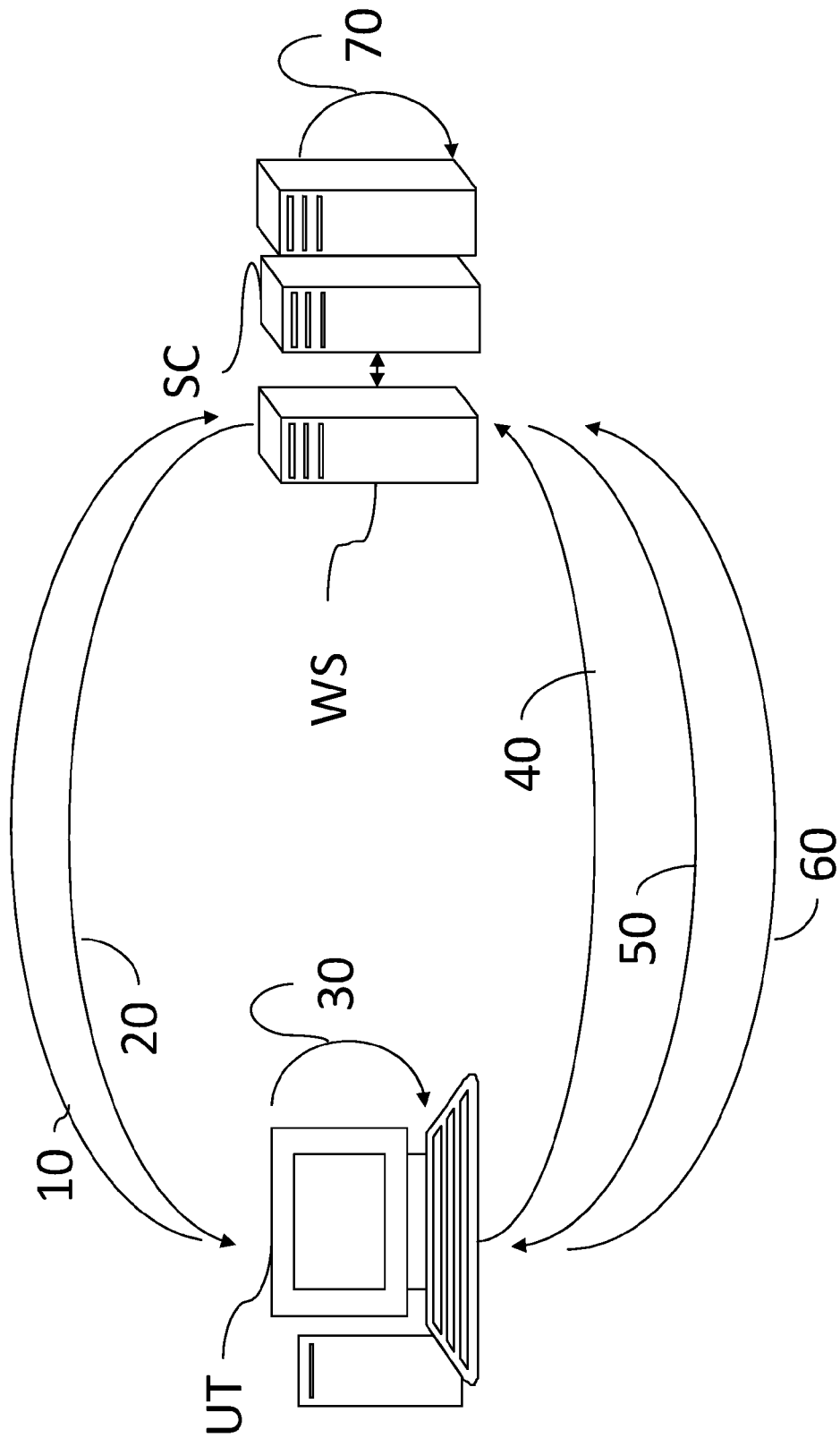
FIG. 1 depicts an block diagram of an exemplary embodiment of the current system invention and FIG. 2 depicts a flow chart of an exemplary embodiment of the current method invention.
Figure 2:
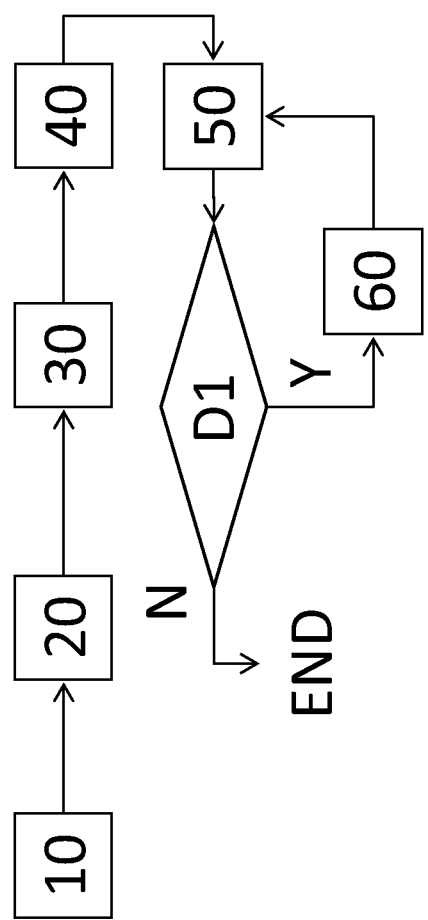

In an exemplary embodiment, the following steps depicted in FIG. 1 and FIG. 2 are executed for accessing quality of an image or video by determining a quality score:

First, the user uses a user terminal UT to connect, in step 10, to web server WS with the browser to fetch in step 20 a webpage embedded a QM applet.

Then, in step 30 the user opens an image/video at his local disk in the applet UI running on the user terminal UT. The QM applet extracts some or all artefact features from the user's image/video in step 30.

Next, the QM applet sends the artefact features to server centre SC via the web server WS in step 40. The server centre SC may be an integral part of the web server WS.

The QM server centre SC calculates the perceived quality score with the artefact features and transmits, in step 50, the calculated score back to the client's end UT where the quality score is displayed.

If the user decides in decision step D1 that the received score is unsatisfying, he/she can input his feedback in the client UI of the user terminal UT. Then in step 60, user feedback is transmitted to the server centre SC to improve the QM algorithm. Together with the feedback, a request for re-determination of the quality score can be transmitted in step 60 from the client end UT to the server centre SC in case the user was too unsatisfied with the quality score firstly calculated. The result of such recalculation is transmitted back from server centre SC to user terminal UT in repetition of step 50.

The request for re-determination can be taken into account when modifying, in step 70, the database using the user's feedback. Such requests signals severe disappointment with the prediction results and therefore can be used for triggering a higher impact of the user's feedback on the database than in case where no such request is received in the server centre SC.

The invention claimed is:

1. A user terminal device comprising means for extracting artefact features from media data, means for transmitting the extracted artefact features to a server device, means for receiving quality scores for the media data from the server device, means for presenting a received quality score to a user, and means for receiving, from the user, a subjective quality score and a request for re-determining the quality score wherein the means for transmitting is adapted for communicating the request for re-determining the quality score and the subjective quality score to the server device.

2. A server device comprising means for receiving, from a user terminal device, artefact features extracted from media data, means for determining a quality score for the media data using the received artefacts, means for transmitting the determined quality score to the user terminal device, and means for receiving, from the user terminal device, a request for re-determining of the quality score and a subjective quality score wherein the means for determining a quality score is adapted for re-determining the quality score for the media data further using the received subjective quality score.

3. The device according to claim 2, wherein said means for determining a quality score is trained using an artefact/quality score database and wherein the device is further adapted for using at least the received artefacts and the received subjective score for re-training the means for determining a quality score.

4. The device according to claim 3, further using the artefact/quality score database for re-training said means for determining a quality score.

5. A system comprising a user terminal device according to claim 1 and a server device.

6. A method for assessing quality of media data, comprising the steps of using a user terminal device for extracting artefact features from the media data and for communicating the extracted features to a serving device, using the server device for determining a quality score for the media data, wherein the quality score for the media data is determined using the received artefacts, using the server device for transmitting the determined quality score to the user terminal device, using the user terminal device for presenting the received quality score to a user and for receiving, from the user, a subjective quality score and a request for re-determining the quality score, using the user terminal device communicating the request for re-determining the quality score and the subjective quality score to the server device, using the server device for re-determining the quality score for the media data, wherein the quality score for the media data is re-determined further using the received subjective quality score, and using the server device for transmitting the re-determined quality score to the user terminal device.

7. The method according to claim 6, wherein said server device is trained using an artefact/quality score database, said method further comprising using at least the received artefacts and the received subjective score for re-training the server device.

8. The method according to claim 7, further comprising further using the artefact/quality score database for re-training.

9. A user terminal device comprising:
   a processor that extracts artefact features from media data;
   a transmitter that transmits the extracted features to a server device;
   a receiver that receives quality scores for the media data from the server device, wherein the processor provides a received quality score to a user, and
   a user interface that receives, from the user, a subjective quality score and a request for re-determining the quality score wherein the transmitter communicates the request for re-determining the quality score and the subjective quality score to the server device.

10. A server device comprising:
    a receiver that receives, from a user terminal device, artefact features extracted from media data;
    a processor that determines a quality score for the media data using the received artefacts;
    a transmitter that transmits the determined quality score to the user terminal device, wherein the receiver receives, from the user terminal device, a request for re-determining of the quality score and a subjective quality score wherein the processor is adapted for re-determining the quality score for the media data further using the received subjective quality score.

11. The device according to claim 10, wherein said processor is trained using an artefact/quality score database and wherein the device is further adapted for using at least the received artefacts and the received subjective score for re-training the processor.

12. The device according to claim 11, further using the artefact/quality score database for re-training said processor.

13. Method for assessing quality of media data, comprising, at a user terminal:
    extracting artefact features from the media data;
    communicating the extracted features to a server device;
    receiving a quality score from the server device;
    presenting the received quality score to a user;
    receiving, from the user, a subjective quality score and a request for re-determining the quality score;
    communicating the request for re-determining the quality score and the subjective quality score to the server device for re-determining the quality score for the media data, wherein the quality score for the media data is re-determined further using the received subjective quality score; and
    receiving the re-determined quality score.

14. A method for assessing quality of media data, comprising, at a server device:
    receiving, from a user device, artefact features extracted from the media data;
    determining a quality score for the media data, wherein the quality score for the media data is determined using the received artefacts;
    transmitting the determined quality score to the user terminal device;
    receiving a request for re-determining the quality score and the quality score from the user device;
    re-determining the quality score for the media data, wherein the quality score for the media data is re-determined further using the received subjective quality score, and
    transmitting the re-determined quality score to the user terminal device.

15. The method according to claim 14, wherein said server device is trained using an artefact/quality score database, said method further comprising using at least the received artefacts and the received subjective score for re-training the server device.

16. Method according to claim 15, further comprising using the artefact/quality score database for re-training.

* * * * *